United States Patent
Minteer et al.

(10) Patent No.: US 12,500,026 B2
(45) Date of Patent: Dec. 16, 2025

(54) MULTIPHASE POWER-HARVESTING SENSOR DEVICES AND SYSTEMS

(71) Applicant: Schweitzer Engineering Laboratories, Inc., Pullman, WA (US)

(72) Inventors: Timothy M. Minteer, Pullman, WA (US); David Kenny, Pullman, WA (US); Johnny J. Moore, Moscow, ID (US); Raymond W. Rice, Pullman, WA (US); Benjamin T. Rowland, Pullman, WA (US); Lyssa W. Blood, Potlatch, WA (US); Brett Taggart, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 412 days.

(21) Appl. No.: 18/183,710

(22) Filed: Mar. 14, 2023

(65) Prior Publication Data
US 2024/0312688 A1    Sep. 19, 2024

(51) Int. Cl.
*H01F 27/06* (2006.01)
*G01R 21/00* (2006.01)
(Continued)

(52) U.S. Cl.
CPC ............. *H01F 27/06* (2013.01); *G01R 21/00* (2013.01); *H01F 27/29* (2013.01); *H01F 38/28* (2013.01); *H02J 50/001* (2020.01)

(58) Field of Classification Search
CPC .......... H01F 27/06; H01F 27/29; H01F 38/28; H02J 50/001; G01R 21/00; G01R 21/06;
(Continued)

(56) References Cited

U.S. PATENT DOCUMENTS 4,975,629 A    12/1990  Callahan
5,226,509 A     7/1993  Smith
(Continued)

FOREIGN PATENT DOCUMENTS

CN    202632967 U  * 12/2012
KR    102302101 B1 *  9/2021  ............... G05F 3/26

OTHER PUBLICATIONS

Park; Translation of KR 102302101 B1; Sep. 15, 2021; Translated by Clarivate (Year: 2021).*

(Continued)

*Primary Examiner* — Alesa Allgood
*Assistant Examiner* — Rahul Maini
(74) *Attorney, Agent, or Firm* — Justin K. Flanagan

(57) ABSTRACT

A current transformer (CT) isolation clamp is mounted to a phase conductor and includes a step-down CT transformer and a passive isolation transformer. A three-phase power-harvesting sensor system includes a plurality of CT isolation clamps mounted to phase conductors in a three-phase power system. An electronics module is connected to the CT isolation clamps. The electronics module may include a sensing circuit to determine power characteristics of the three-phase power system based on the outputs of the CT isolation clamps. The electronics module may include a communication subsystem to transmit the determined power characteristics to local or remote devices. Additionally, the electronics module may include a power harvesting circuit to harvest power to operate the sensing circuit and the communication subsystem.

24 Claims, 14 Drawing Sheets

(51) Int. Cl.
*H01F 27/29* (2006.01)
*H01F 38/28* (2006.01)
*H02J 50/00* (2016.01)

(58) Field of Classification Search
CPC .. G01R 21/07; G01R 21/133; G01R 19/2513; G01R 15/14–142; G01R 15/18; G01R 15/183; G01R 15/185; G01R 15/186; G06F 1/26
USPC .............................................. 324/123 R, 127
See application file for complete search history.

(56) References Cited

U.S. PATENT DOCUMENTS

| | | | |
|---|---|---|---|
| 5,406,495 A * | 4/1995 | Hill | G01R 21/1331 324/141 |
| 7,003,912 B1 | 2/2006 | Morgan | |
| 8,650,411 B2 | 2/2014 | Feight | |
| 10,333,312 B2 | 6/2019 | Zweigle | |
| 10,848,092 B2 | 11/2020 | Donolo | |
| 10,886,857 B1 * | 1/2021 | Karsten | H01F 27/28 |
| 10,938,198 B2 | 3/2021 | Kasztenny | |
| 11,031,812 B1 | 6/2021 | Schweitzer | |
| 2011/0279942 A1 * | 11/2011 | Bishop | H01F 38/30 361/93.6 |
| 2014/0028282 A1 * | 1/2014 | Perry | G01R 19/0092 324/76.11 |
| 2016/0204617 A1 * | 7/2016 | Gilbert | G01R 19/2513 73/865.9 |
| 2021/0132117 A1 * | 5/2021 | Takeya | G01R 21/00 |

OTHER PUBLICATIONS

Zhao; Translation of CN202632967 U; Dec. 26, 2012; Translated by Google & EPO (Year: 2012).*
Guo, Feng, Hayat, Hassan, and Wang, Jin: "Energy Harvesting Devices for High Voltage Transmission Line Monitoring" 2011.
Lee, S.; Kim, D.; Jin, Y.; Han, Y.; Desta, Y.; Bryant, M.D.; Goettert, J.: "A Micro corona motor fabricated by a SU-8 built on X-ray mask" Microsystem Technologies, 10, 2004.

* cited by examiner

MULTIPHASE POWER-HARVESTING SENSOR DEVICES AND SYSTEMS

TECHNICAL FIELD

This disclosure relates to three-phase power systems. More particularly, this disclosure relates to sensing and sensor systems to measure electrical values in a three-phase power distribution system.

BRIEF DESCRIPTION OF THE DRAWINGS

Non-limiting and non-exhaustive examples of the disclosure are described with reference to the figures described below.

DETAILED DESCRIPTION

Figure 1:
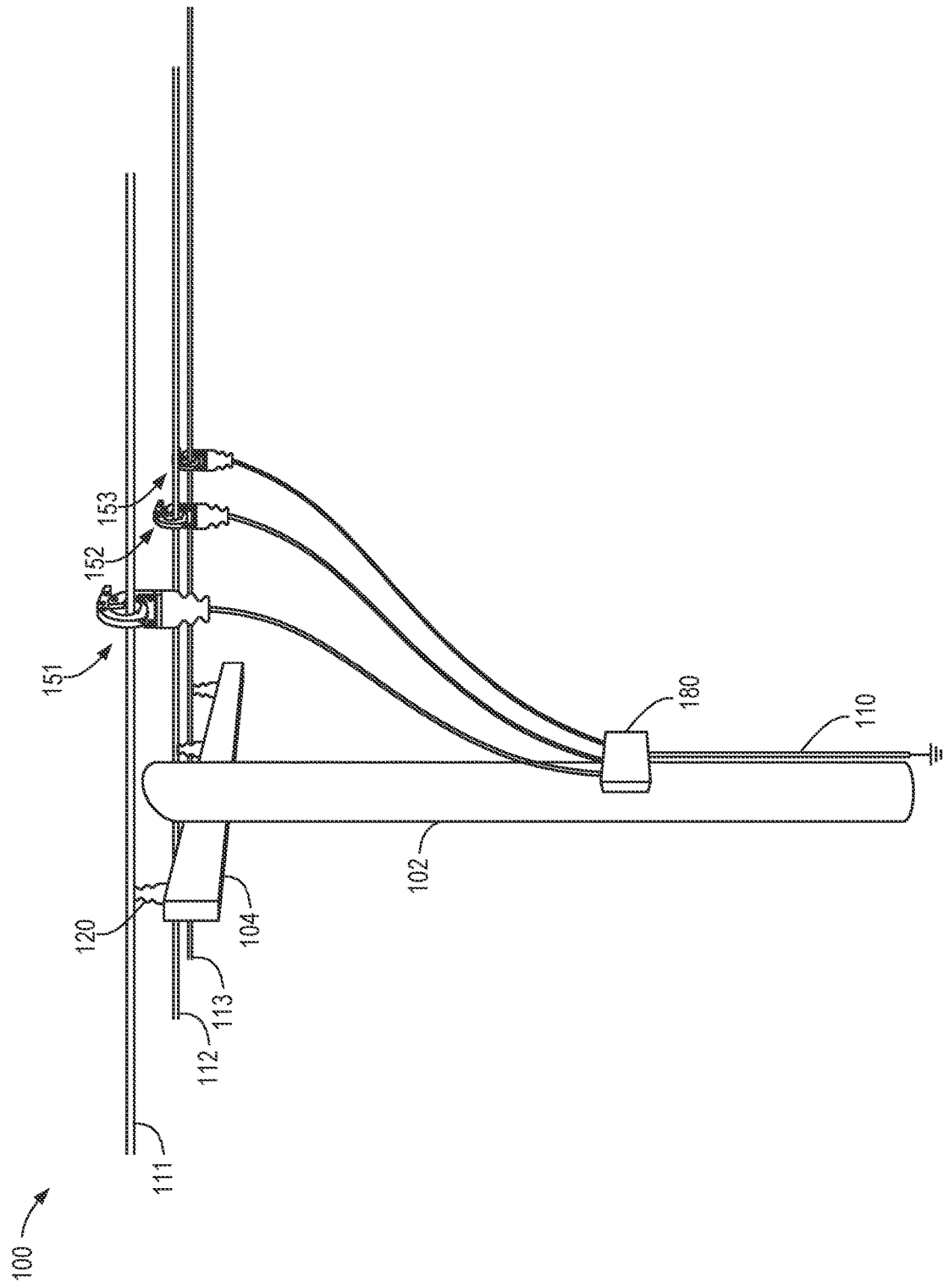
FIG. 1 illustrates an example of a sensor system with integrated power harvesting connected via three current transformer (CT) isolation clamps mounted to three phase conductors, according to one embodiment.

Three-phase power monitoring devices are, in some instances, connected to each phase conductor in a three-phase power distribution system. In some instances, the monitoring or sensor equipment is powered by an external source. In other instances, the monitoring or sensor equipment may harvest power directly from the phase conductors that are being monitored. Relatively high voltage lines, such as phase lines with line-to-line voltages of 38 kilovolts (38 kV), generate corona discharges. A corona discharge is an electrical discharge caused by ionization of fluid (e.g., air) surrounding the high-voltage conductors. Corona discharges can damage printed circuit boards (PCBs), antennas, and other circuit components over time.

Many devices harvest power from only one phase conductor and monitor that same phase conductor. Such devices may be unable to accurately determine or measure the line voltage of the phase conductor. The presently described systems and methods include a passive sensor device mounted to each phase in a three-phase power system. The passive sensor device may, for example, be embodied as a current transformer (CT) isolation clamp, as described herein. Each CT isolation clamp provides electrical isolation and insulation to allow all three CT isolation clamps to be connected to a single electronics module. Moreover, the electrical isolation provided by the CT isolation clamps allows the electronics module to be connected to ground potential, allowing for more accurate measurements, line voltage measurements, and/or the reduction or elimination of corona.

The electronics module may include a sensing circuit or multiple sensing circuits to determine one or more power characteristics of the three-phase power system and/or of the individual phases of the three-phase power system. The combination of the CT isolation clamps and electronics module allows for accurate measurements of the current and voltage of each phase of the three-phase power system. The electronics module may include a single radio or another communication subsystem to communicate the measured power characteristics.

The electronics module includes a power harvesting circuit to harvest power from one or more of the three phase conductors of the three-phase power system. The harvested power is used to power the communication subsystem and the sensing circuit components. Since the electronics module is connected to ground potential, damage due to corona discharges is eliminated and power is harvested via the power harvesting circuit when there is voltage on the phase conductors, even when there is zero current on the phase conductors.

According to various embodiments, a CT isolation clamp includes a mechanical clamping device adapted to selectively secure the CT isolation clamp to a phase conductor. The CT isolation clamp includes a step-down CT configured to provide a stepped-down current on a secondary winding that corresponds to a current of the phase conductor stepped down by a first step-down ratio. For example, a single primary winding may be integrated into or combined with the mechanical clamping device secured around the phase conductor. A step-down secondary winding may provide a current stepped down by a step-down ratio of, for example, 1:10,000.

The CT isolation clamp also includes an isolation CT with a primary winding connected to the secondary winding of the step-down CT and an isolated secondary winding that provides a threshold level of electrical isolation. According to various embodiments, the isolation CT is a passive isolation CT in that the primary winding of the isolation CT and the secondary winding of the isolation CT have the same number of turns (e.g., 100 turns, 194 turns, 300 turns, etc.). In other embodiments, the isolation CT is a step-down isolation CT where the number of windings in the primary winding of the isolation CT is greater than the number of windings in the isolated secondary winding of the isolation CT. According to various embodiments, the isolated secondary winding of the CT isolation clamp comprises a toroidal-wound core covered in a dielectric material that provides the threshold level of electrical isolation. In such embodiments, the primary winding of the CT isolation clamp is wound around the dielectric material.

The specific level of electrical isolation may be adjusted for a particular application or installation. In examples in which the CT isolation clamp is used in a distribution system with line-to-line voltages of 38 kV, the isolation CT may provide 22 kV of electrical isolation (e.g., line-to-ground voltage) between the primary and secondary windings. Multiple isolation CTs in series may be used to achieve electrical isolations of 44 kV, 66 kV, 88 kV, etc. Alternatively, the isolation layer or material between the primary and secondary windings of the isolation CT may be increased in thickness or manufactured using a different material that provides increased electrical isolation.

In some embodiments, the isolation CT includes a center tap on the primary winding that is configured to be connected directly to the phase conductor and a center tap on the secondary winding that is configured to be connected to a power harvesting circuit. As detailed herein, the parasitic capacitance between the center-taped primary and secondary windings is used to drive the power harvesting circuit and for accurate line voltage sensing.

In some embodiments, the isolation CT includes a primary shield positioned between the dielectric material (dielectric spacer) and the primary winding of the passive isolation CT. The primary shield is connected to the phase conductor via a wire. The isolation CT also includes a secondary shield positioned between the secondary windings and the dielectric spacer. A parasitic capacitance is created between the primary shield and the secondary shield. The secondary shield is configured to be connected to a power harvesting circuit.

According to various embodiments, a CT isolation clamp is connected to each phase of a three-phase power transmission or distribution system. For example, a first CT isolation clamp may be mounted to a first phase conductor of the three-phase power system. A second CT isolation clamp may be mounted to a second phase conductor of the three-phase power system. A third CT isolation clamp may be mounted to a third phase conductor of the three-phase power system The three CT isolation clamps may be connected to a single electronics module due to the electrical isolation provided by each of the CT isolation clamps. The electronics module may include a sensing circuit to determine one or more power characteristics of the three-phase power system. For example, the sensing circuit may include individual sensing circuits to detect voltage and/or current values of each phase of the three-phase power system. In some embodiments, the sensing circuit includes differential amplifiers to measure current values and/or voltage measurement circuitry. One or more analog-to-digital converters (ADCs) may be used to convert measured values to digital signals for recording and/or transmission.

The electronics module may include an integrated communication subsystem to transmit the determined power characteristic(s) to a remote device. The electronics module may also include a power harvesting circuit to harvest power via the CT isolation clamps. The harvested power is used to operate the sensing circuit and/or the communication subsystem. In some embodiments, the power harvesting circuit comprises a single isolated switch mode supply with rectified inputs from center taps on the secondary windings of each of the isolation CTs of the three CT isolation clamps. In some embodiments, the power harvesting circuit comprises two switch mode supplies referenced to ground potential with rectified inputs from the center taps on the secondary windings of the isolation CTs of the CT isolation clamps.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules. As used herein, a software module may include any type of computer instruction or computer-executable code located within a memory device that is operable in conjunction with appropriate hardware to implement the programmed instructions. A software module may, for instance, comprise one or more physical or logical blocks of computer instructions, which may be organized as a routine, program, object, component, data structure, etc., that performs one or more tasks or implements particular data types.

Embodiments may be provided as a computer program product including a non-transitory machine-readable medium having stored thereon instructions that may be used to program a computer or other electronic device to perform processes described herein. The non-transitory machine-readable medium may include but is not limited to, hard drives, ROMs, RAMs, EPROMs, EEPROMs, solid-state memory devices, or other types of machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific integrated circuit (ASIC), a programmable logic device (PLD), a field programmable gate array (FPGA), or another customizable or programmable device.

FIG. 1 illustrates an example of a sensor system 100 with integrated power harvesting connected via three current transformer (CT) isolation clamps 151, 152, and 153 mounted to three phase conductors 111, 112, and 113, according to one embodiment. As illustrated, the CT isolation clamps 151, 152, and 153 are mounted or clamped around the three phase conductors 111, 112, and 113 and operate as passive sensors. The three phase conductors 111, 112, and 113 are supported by standoff insulators 120 on the cross arm 104 of a power pole 102. The three CT isolation clamps 151, 152, and 153 are connected to a single electronics module 180 that is referenced to ground 110. The line-to-line voltage between the three phase lines may be 38 kV, in which case each of the CT isolation clamps 151, 152, and 153 may provide 22 kV of electrical isolation to accommodate the ground-referenced electronics module 180. The sensor system 100 may be configured to operate in conjunction with a three-phase power system in a delta configuration.

Figure 2:
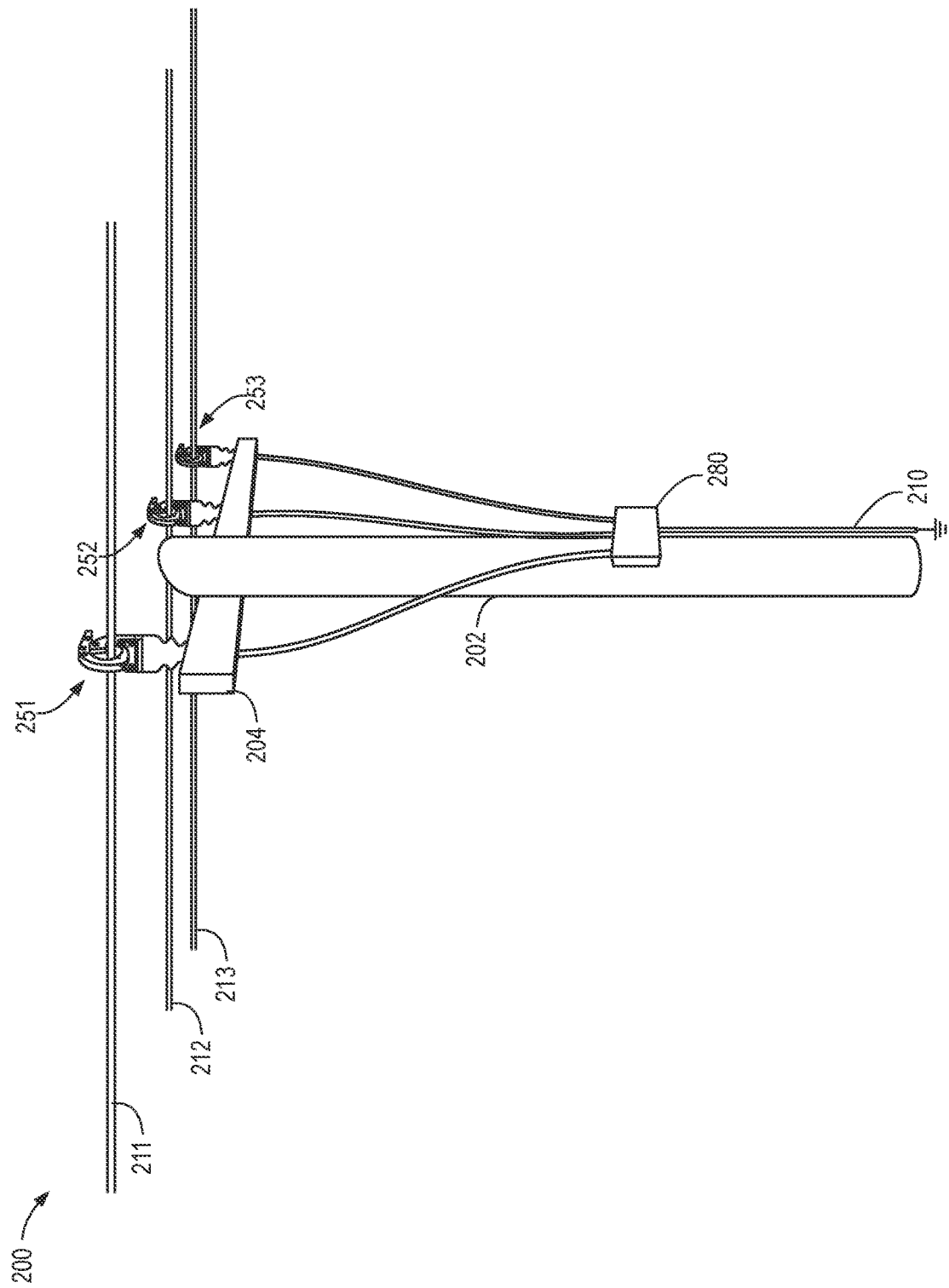
FIG. 2 illustrates an example of a sensor system with integrated power harvesting connected via three CT isolation clamps configured as replacement standoff insulators, according to one embodiment.

FIG. 2 illustrates an example of a sensor system 200 with integrated power harvesting connected via three CT isolation clamps 251, 252, and 253 configured as replacement standoff insulators, according to one embodiment. As illustrated, the CT isolation clamps 251, 252, and 253 are mounted directly to a cross arm 204 of a power pole 202. The CT isolation clamps 251, 252, and 253 provide electrical isolation between three phase lines 211, 212, and 213 and the power pole 202 and cross arm 204, between the three phase lines 211, 212, and 213 and ground 210 within an electronics module 280, and between the three phase lines 211, 212, and 213 themselves. The sensor system 200 may be configured to operate in conjunction with a three-phase power system in a delta configuration.

Figure 3:
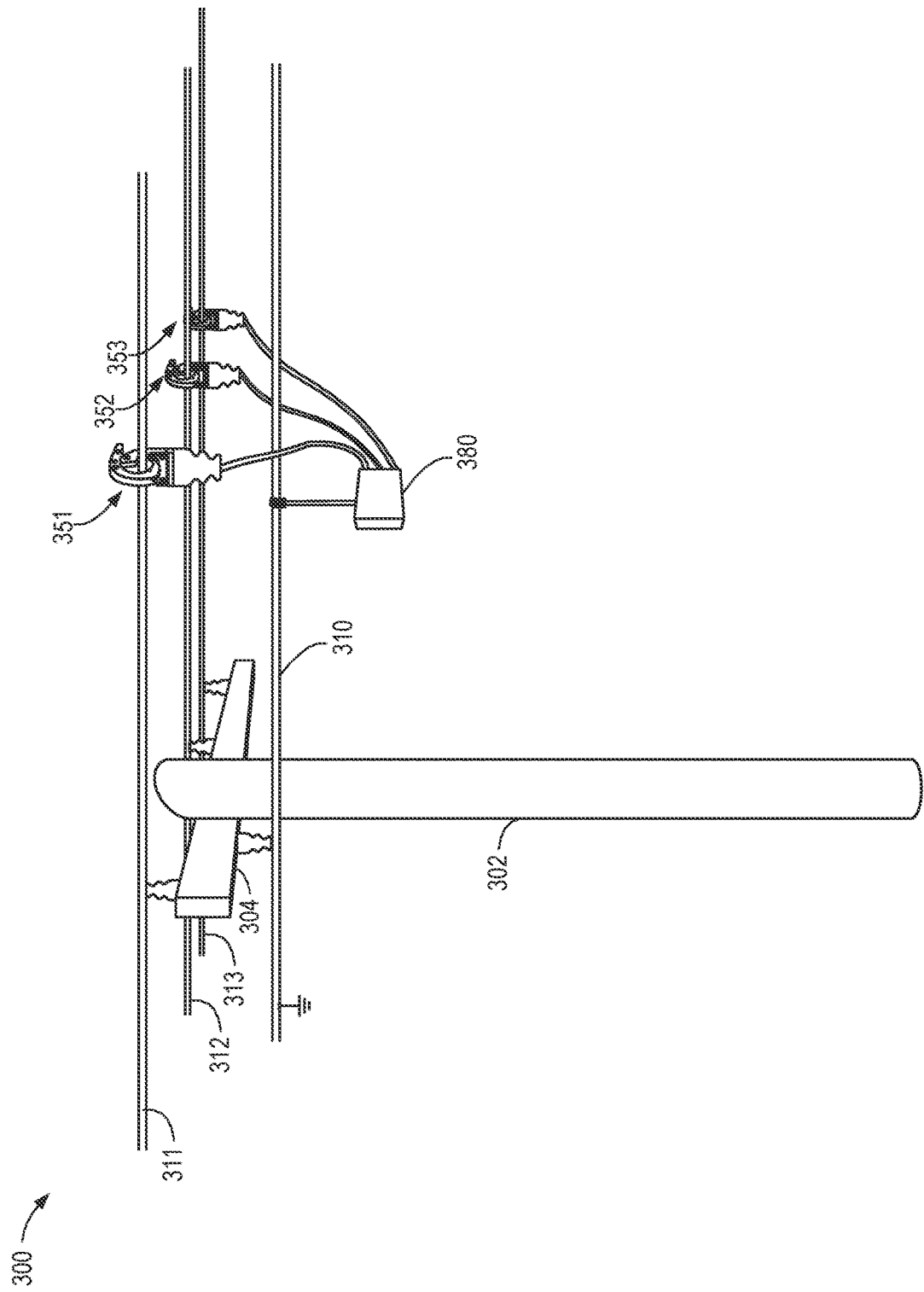
FIG. 3 illustrates an example of a sensor system with integrated power harvesting directly connected to an overhead ground conductor and connected via CT isolation clamps mounted to three phase conductors, according to one embodiment.

FIG. 3 illustrates an example of a sensor system 300 with integrated power harvesting directly connected to an overhead ground conductor 310 and connected via CT isolation clamps 351, 352, and 353 mounted to phase conductors 311, 312, and 313, according to one embodiment. The illustrated configuration may be used to avoid installation proximate to a power pole 302 and cross arm 304. An electronics module 380 is mounted to or hangs from the overhead ground conductor 310. The sensor system 300 may be configured to operate in conjunction with a three-phase power system in a wye configuration.

According to various embodiments, the sensor systems described herein may be configured for operation in conjunction with three-phase power systems in delta configurations or in wye configurations. Sensor systems configured for use in conjunction with three-phase power systems in delta configuration may measure the three phase voltages and use phasor calculations to convert to a delta representation of the voltages between the A, B, and C phase lines (e.g., $V_{ab}$, $V_{bc}$, and $V_{ca}$). In some instances, the sensor system is manufactured for specific use with wye-configuration or delta-configuration. In other embodiments, the sensor systems described herein may be configured post-manufacturing (e.g., by the installer or end-user) for use with both delta and wye power systems. For example, the sensor system may be selectively switched between a delta-mode and a wye-mode via a hardware configuration (e.g., a switch or a button), a software configuration or update, and/or a firmware installation.

Figure 4:
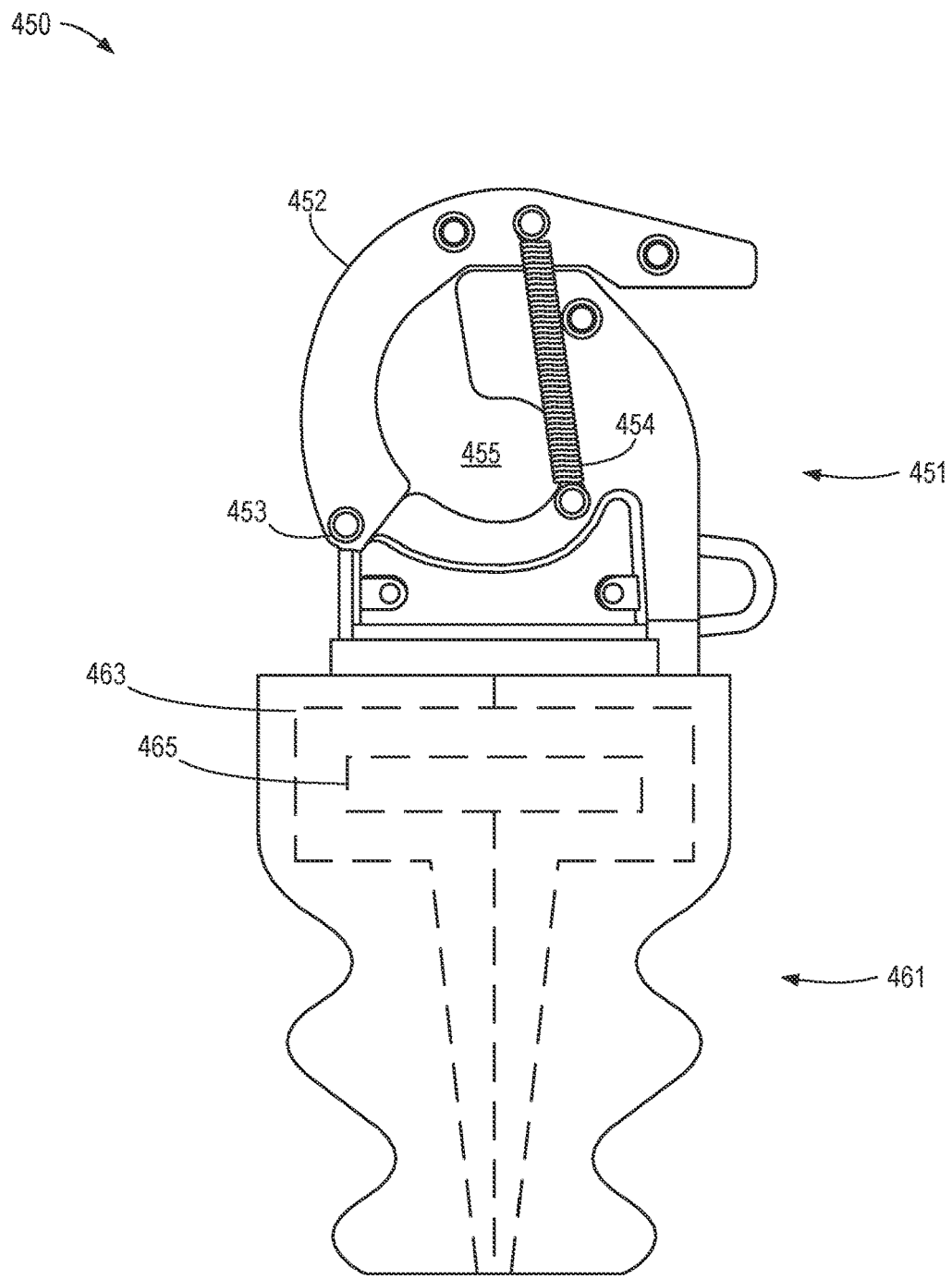
FIG. 4 illustrates an example of a CT isolation clamp to be clamped around a phase conductor, according to one embodiment.

FIG. 4 illustrates an example of a CT isolation clamp 450 to be clamped around a phase conductor, according to one embodiment. As illustrated, the CT isolation clamp 450 includes a mechanical clamping device that includes an upper arm 452 that pivots around a pivot point 453 to open and selectively close to secure a phase conductor within an aperture 455. A spring 454, another mechanical biasing feature, magnets, mechanical latches, fasteners, and/or other components may be used to permanently or semi-permanently secure the phase conductor within the aperture 455. The mechanical clamping device may be part of a clamp-on step-down CT 451.

As illustrated, the CT isolation clamp 450 also includes an isolation CT 461 that includes a center-tapped primary winding 463 and an isolated secondary winding 465 with a center tap for connection to a power harvesting circuit of an electronics module. According to various embodiments, the isolation CT 461 is a passive isolation CT in which the center-tapped primary winding 463 and the isolated secondary winding 465 have the same number of turns. In contrast, the clamp-on step-down CT 451 may operate to step down the current by a chosen step-down ratio (e.g., 1:10,000, 1:20,000, 1:40,000, etc.). The center tap of the primary winding 463 of the isolation CT 461 may be directly connected to the phase conductor, as described in detail herein.

Figure 5A:
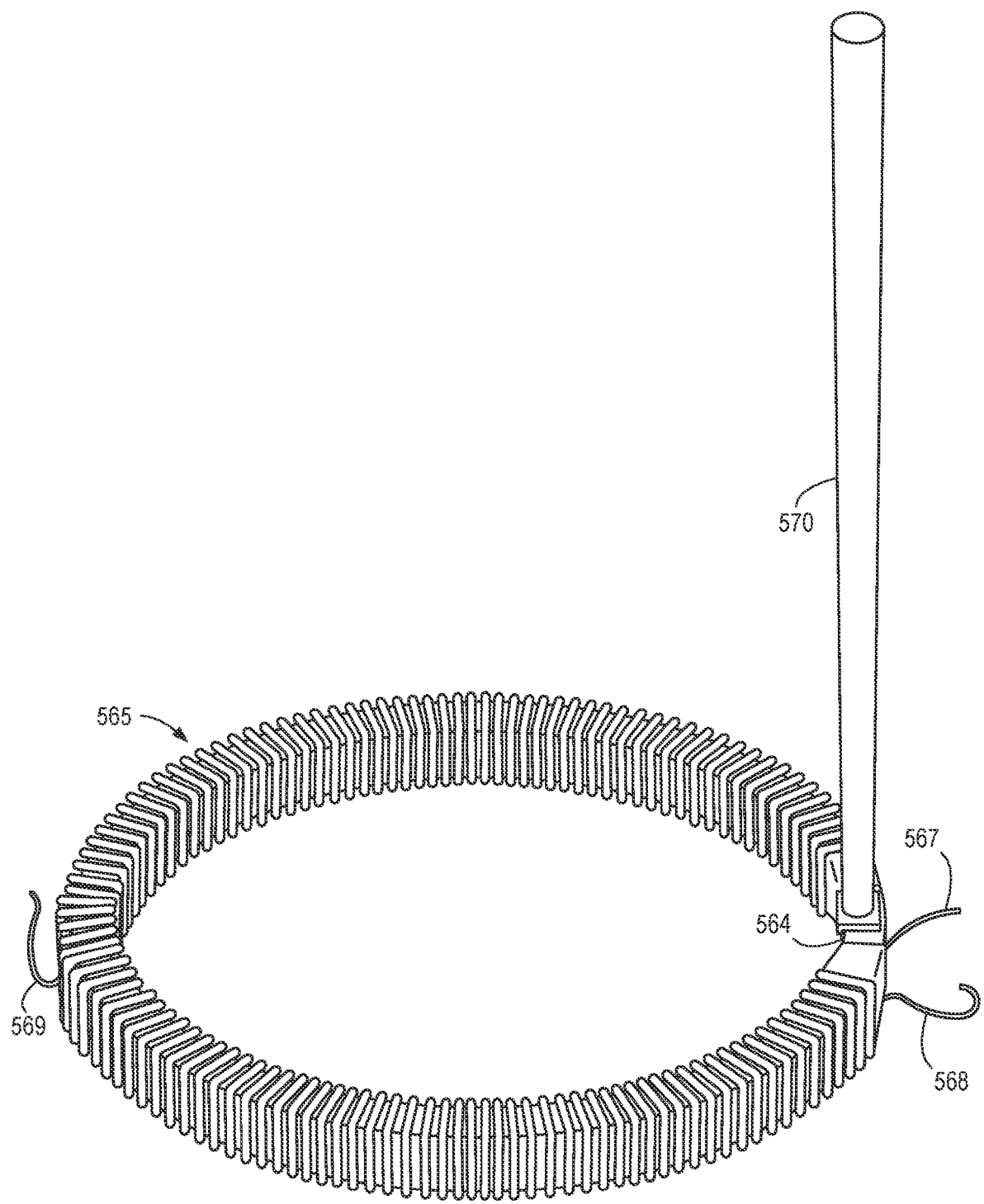
FIG. 5A illustrates an example of a center-tapped secondary winding around a toroidal core of a CT isolation clamp, according to one embodiment.

FIG. 5A illustrates an example of a center-tapped secondary winding 565 around a toroidal core 564 of a CT isolation clamp, according to one embodiment. As illustrated, the center-tapped secondary winding 565 includes a first end wire 567 and a second end wire 568. The center-tapped secondary winding 565 also includes a center tap wire 569 configured to be connected to a power harvesting circuit of an electronics module. An extension rod 570 extends from the toroidal core 564. In some embodiments, the first end wire 567, the second end wire 568, and the center tap wire 569 may be secured to and extended along the exterior of the extension rod 570. In some embodiments, the extension rod 570 may be hollow and the first end wire 567, second end wire 568, and the center tap wire 569 may pass through the extension rod 570.

Figure 5B:
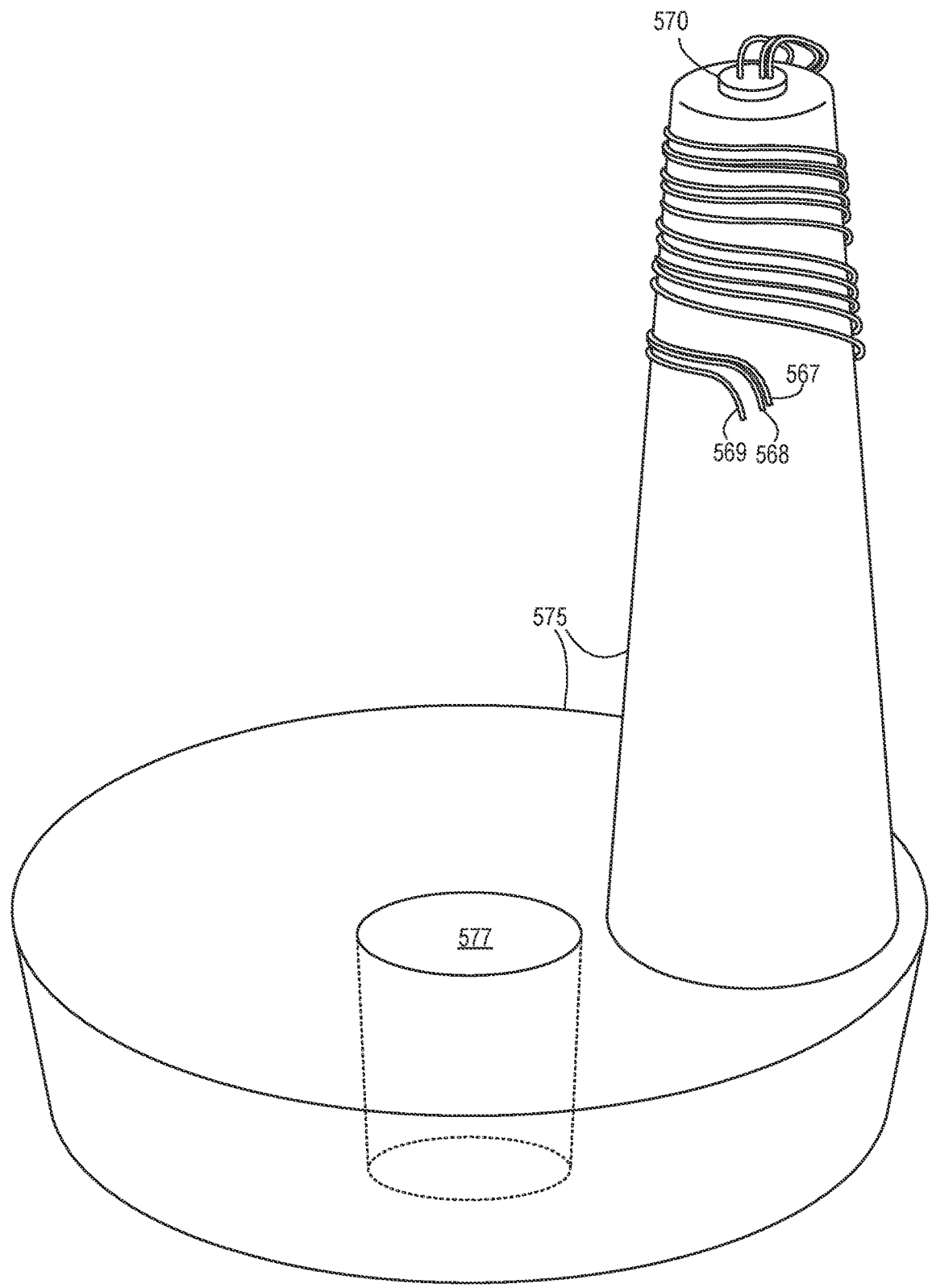
FIG. 5B illustrates an example of a toroidal isolation layer applied around the secondary center-tapped winding and toroidal core of the CT isolation clamp, according to one embodiment.

FIG. 5B illustrates an example of a toroidal isolation layer 575 applied around the secondary center-tapped winding (not visible) and toroidal core (not visible) of the CT isolation clamp, according to one embodiment. The toroidal isolation layer 575 extends up the extension rod 570 as a continuous isolation layer 575. In some embodiments, the toroidal isolation layer 575 comprises a dielectric epoxy. As illustrated, a hole or aperture 577 in the toroidal isolation layer 575 passes through the toroidal core of the secondary center-tapped winding. As illustrated, wires from the secondary center-tapped winding pass through the extension rod 570 and extend therefrom, including the first end wire 567, the second end wire 568, and the center tap wire 569.

Figure 5C:
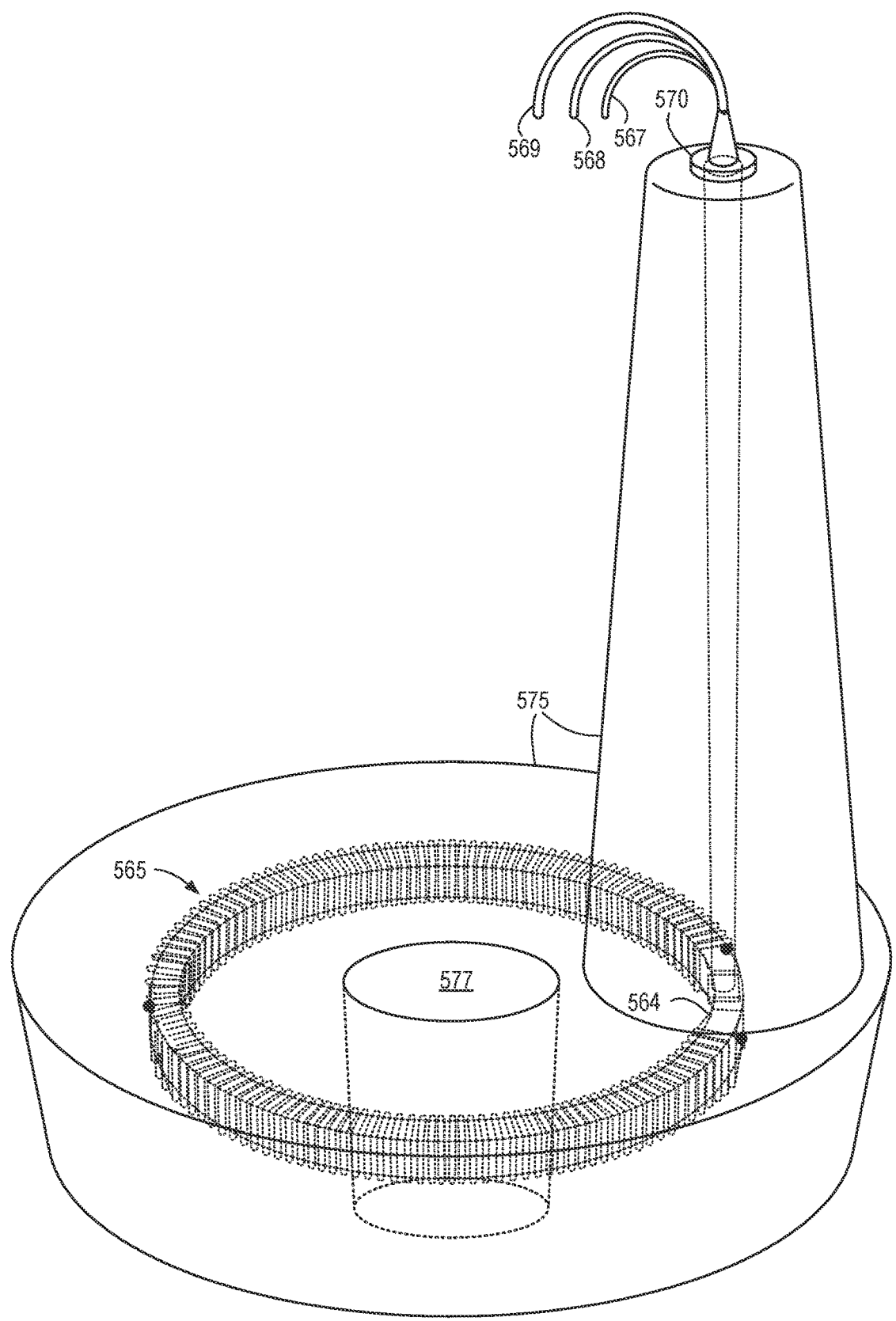
FIG. 5C illustrates an internal view of the center-tapped secondary winding and toroidal core of the CT isolation clamp in broken lines within the toroidal isolation layer, according to one embodiment.

FIG. 5C illustrates an internal view of the center-tapped secondary winding 565 and toroidal core 564 in broken lines within the toroidal isolation layer 575, according to one embodiment. The connection points for the first end wire 567, the second end wire 568, and the center tap wire 569 that extend from the extension rod 570 are illustrated as black dots on the center-tapped secondary winding 565. The aperture 577 remains available for winding a primary winding of the isolation CT, as described below.

Figure 5D:
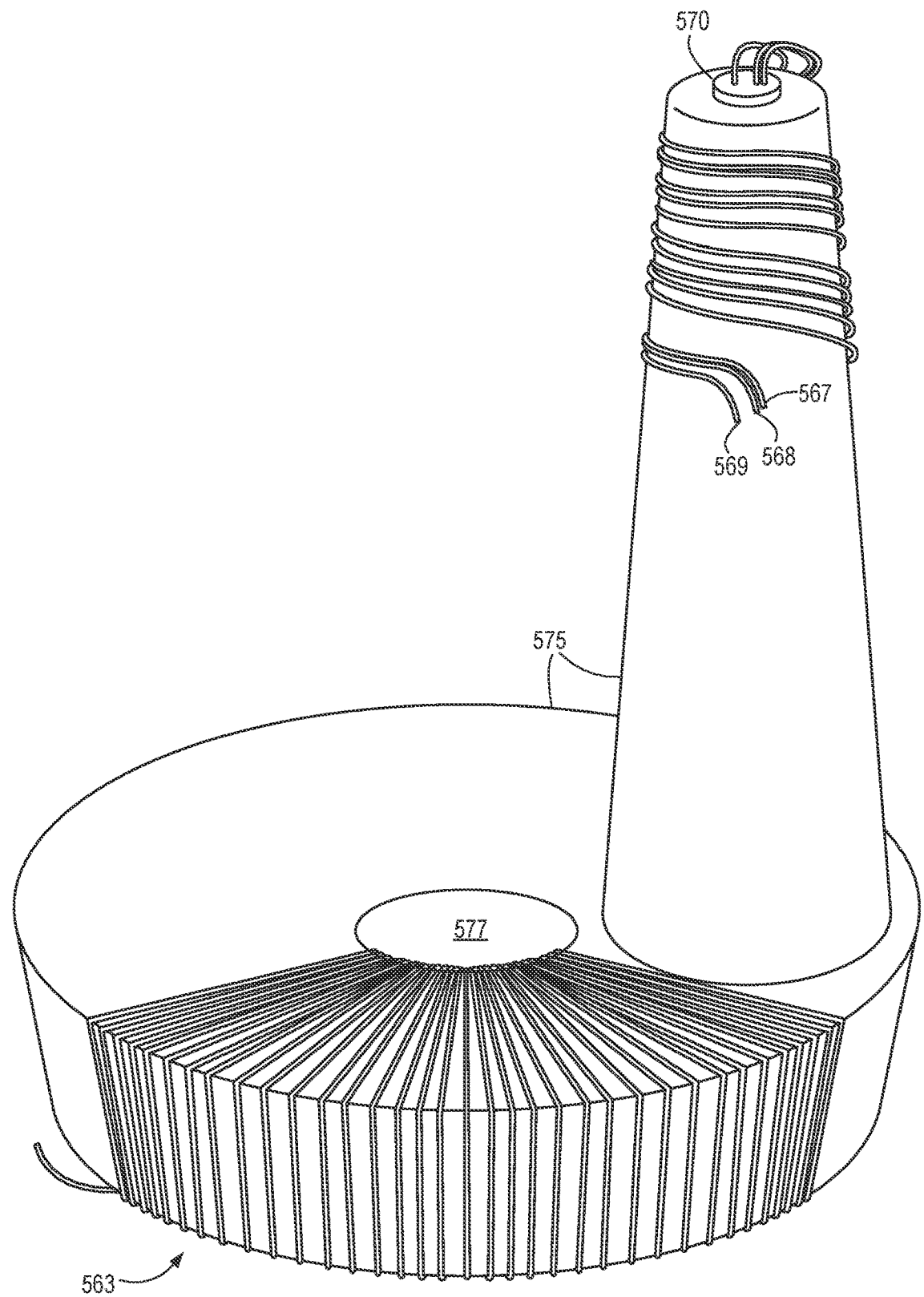
FIG. 5D illustrates a primary winding partially applied to the exterior of the toroidal isolation layer of the CT isolation clamp, according to one embodiment.

FIG. 5D illustrates the primary winding 563 partially applied to the exterior of the toroidal isolation layer 575 through the aperture 577. The primary winding 563 can be wound around the entire perimeter of the toroidal isolation layer 575. In various embodiments, the isolation CT comprises a passive isolation CT where the primary winding 563 and the secondary winding (not visible) have the same number of turns.

Figure 5E:
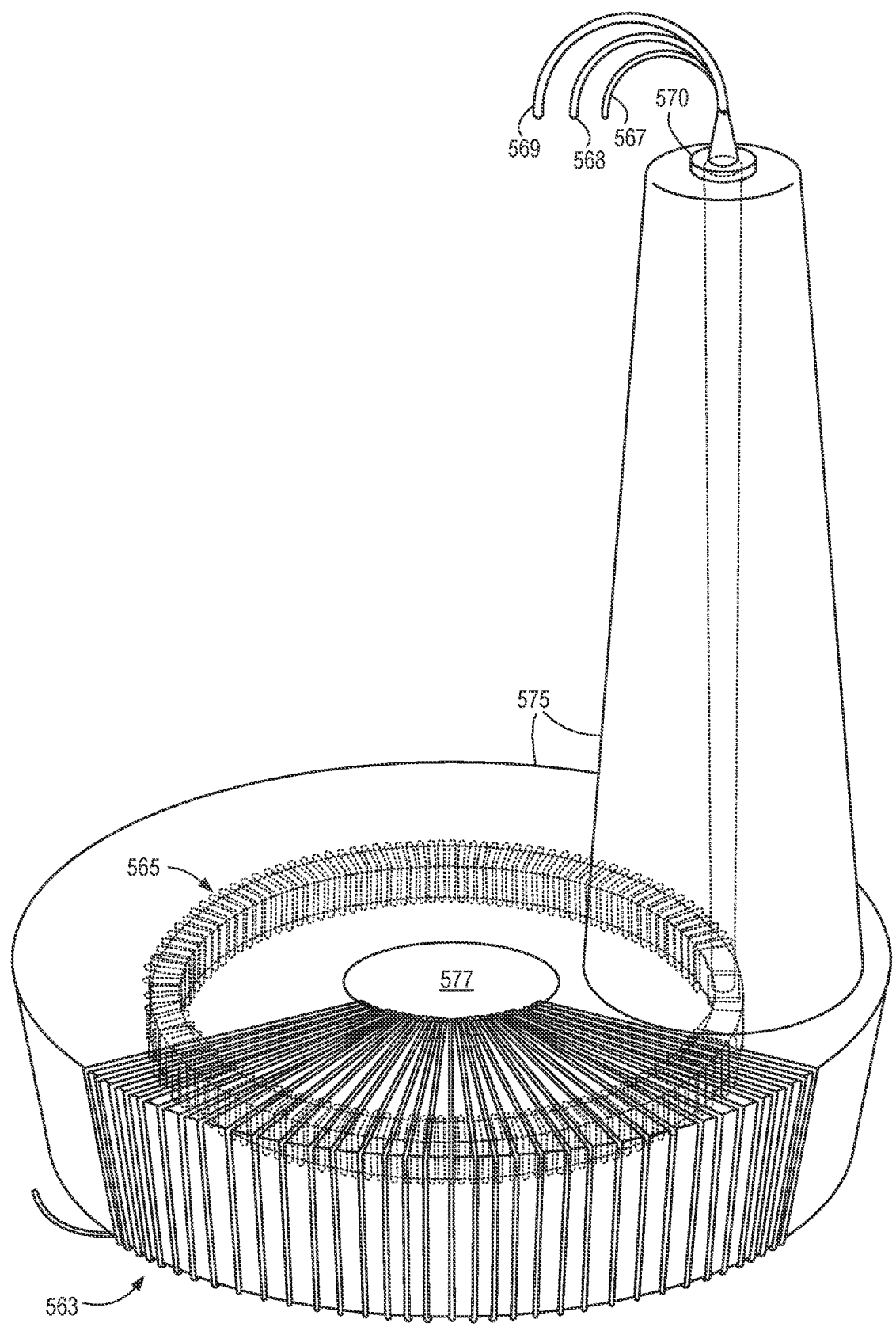
FIG. 5E illustrates an internal view of the center-tapped secondary winding and toroidal core within the toroidal isolation layer with the primary winding partially applied to the exterior thereof, according to one embodiment.

FIG. 5E illustrates an internal view of the center-tapped secondary winding 565 within the toroidal isolation layer 575 with the primary winding 563 partially applied to the exterior thereof, according to one embodiment. As described herein, the center tap wire 568 of the center-tapped secondary winding 565 is configured to be connected to a power harvesting circuit of an electronics module. The primary winding 563 may also be center tapped. The center tap of the primary winding 563 may be directly connected to the phase conductor. A first end and a second end of the primary winding 563 of the isolation CT are connected to the step-down secondary winding of the step-down CT that, in various examples, is integrated within the mechanical clamping portion of the CT isolation clamp.

Figure 6B:
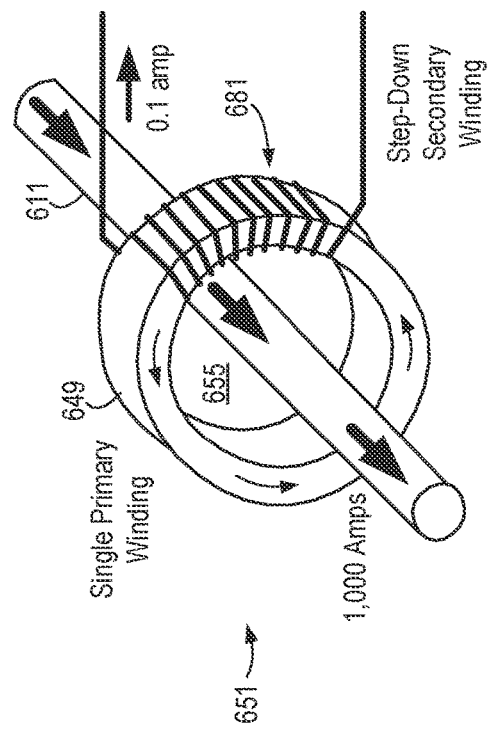
FIG. 6B illustrates a conceptual diagram of a step-down CT of the CT isolation clamp with a step-down secondary winding output, according to one embodiment.
Figure 6C:
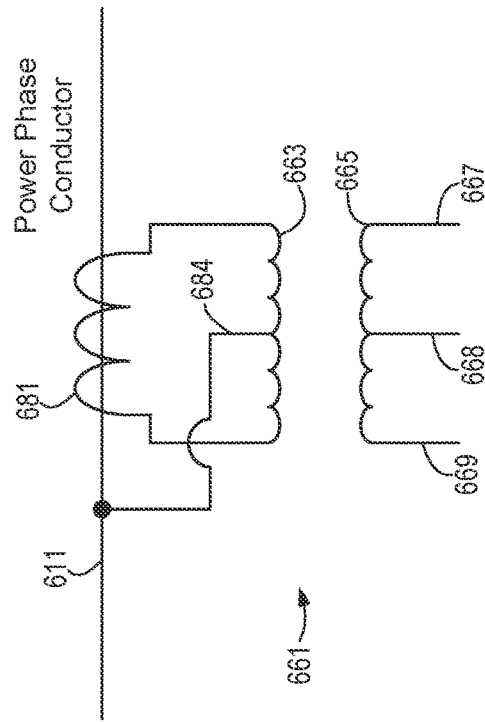
FIG. 6C illustrates a schematic diagram of the CT isolation clamp, including a center-tapped isolation CT, according to one embodiment.
Figure 6A:
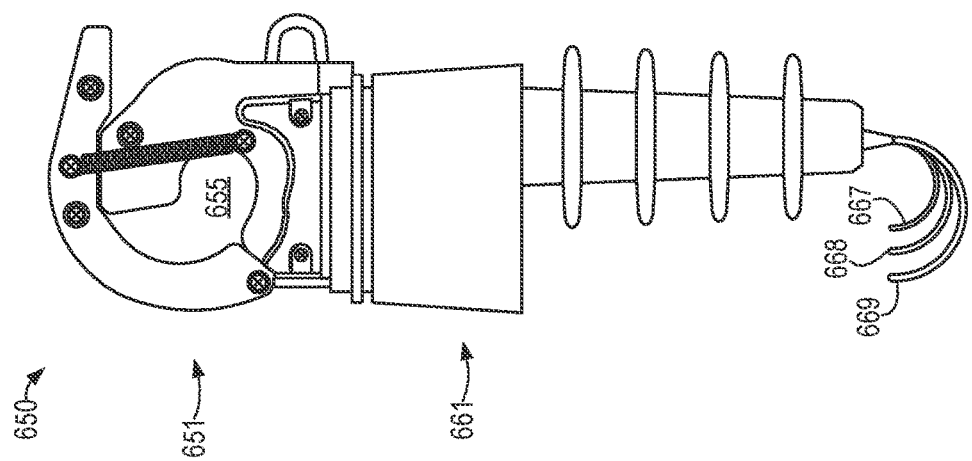
FIG. 6A illustrates an example of an exterior view of a mechanical clamping device and exterior housing of an example CT isolation clamp, according to one embodiment.

FIG. 6A illustrates an example of an exterior view of a CT isolation clamp 650 that includes a clamp-on step-down CT 651 with a mechanical clamping device and an isolation CT 661 within an exterior housing, according to one embodiment. The mechanical clamping device is spring-actuated to be selectively opened to capture a phase line (e.g., a wire or cable) within an aperture 655. As illustrated, a first end wire 667, a second end wire 668, and a center tap wire 669 of an isolated secondary winding of the isolation CT 661 extend from the lower end of the CT isolation clamp 650.

FIG. 6B illustrates a conceptual diagram of a step-down CT of the clamp-on step-down CT 651, according to one embodiment. As illustrated, the phase conductor 611 acts as a primary winding through the magnetic core material comprising a toroid 649. The primary winding may, for example, be integrated as part of the mechanical clamping device illustrated in FIG. 6A. A step-down secondary winding 681 is wound around the primary winding toroid 649. The specific step-down ratio may be selected based on the particular application and usage. In the illustrated example, a step-down ratio of 1:10,000 is used, such that 1,000 amps on the phase conductor 611 results in a counterclockwise flux density in the toroid 649. A clockwise flux density in the toroid 649 induces a 0.1 amp current within the step-down secondary winding 681.

FIG. 6C illustrates a schematic diagram of a CT isolation clamp, according to one embodiment. The schematic diagram includes a step-down secondary winding 681 of a step-down CT (e.g., integrated as part of a clamp-on step-down CT) coupled to a phase conductor 611. An isolation CT 661 includes a primary winding 663 connected to the step-down secondary winding 681. A center tap 684 of the primary winding 663 of the isolation CT 661 is connected directly to the phase conductor 611. A secondary winding 665 of the isolation CT 661 is electrically isolated from the primary winding 663 via an epoxy, dielectric spacer, and/or other dielectric material to provide a threshold level of electrical isolation (e.g., 22 kV of electrical isolation for 38 kV line-to-line installations). In some embodiments, higher levels of electrical isolation may be attained using thicker dielectric spacers and/or different dielectric materials. In other embodiments, multiple isolation CTs 661 may be used in series to provide increased levels of electrical isolation.

The first end wire 667 and the second end wire 669 of the isolated secondary winding 665 of the isolation CT 661 may be connected to measurement circuits, monitoring circuits, or other types of sensing circuits within an electronics module to facilitate measurements of the current on the phase conductor 611. The center tap 668 of the isolated secondary winding 665 of the isolation CT 661 may be connected to measurement circuits, monitoring circuits, or other types of sensing circuits within an electronics module to facilitate accurate measurements of the voltage on the phase conductor 611. Additionally, the center tap 668 of the isolated secondary winding 665 of the isolation CT 661 may be connected to a power harvesting circuit of the electronics module, as described herein.

Figure 7A:
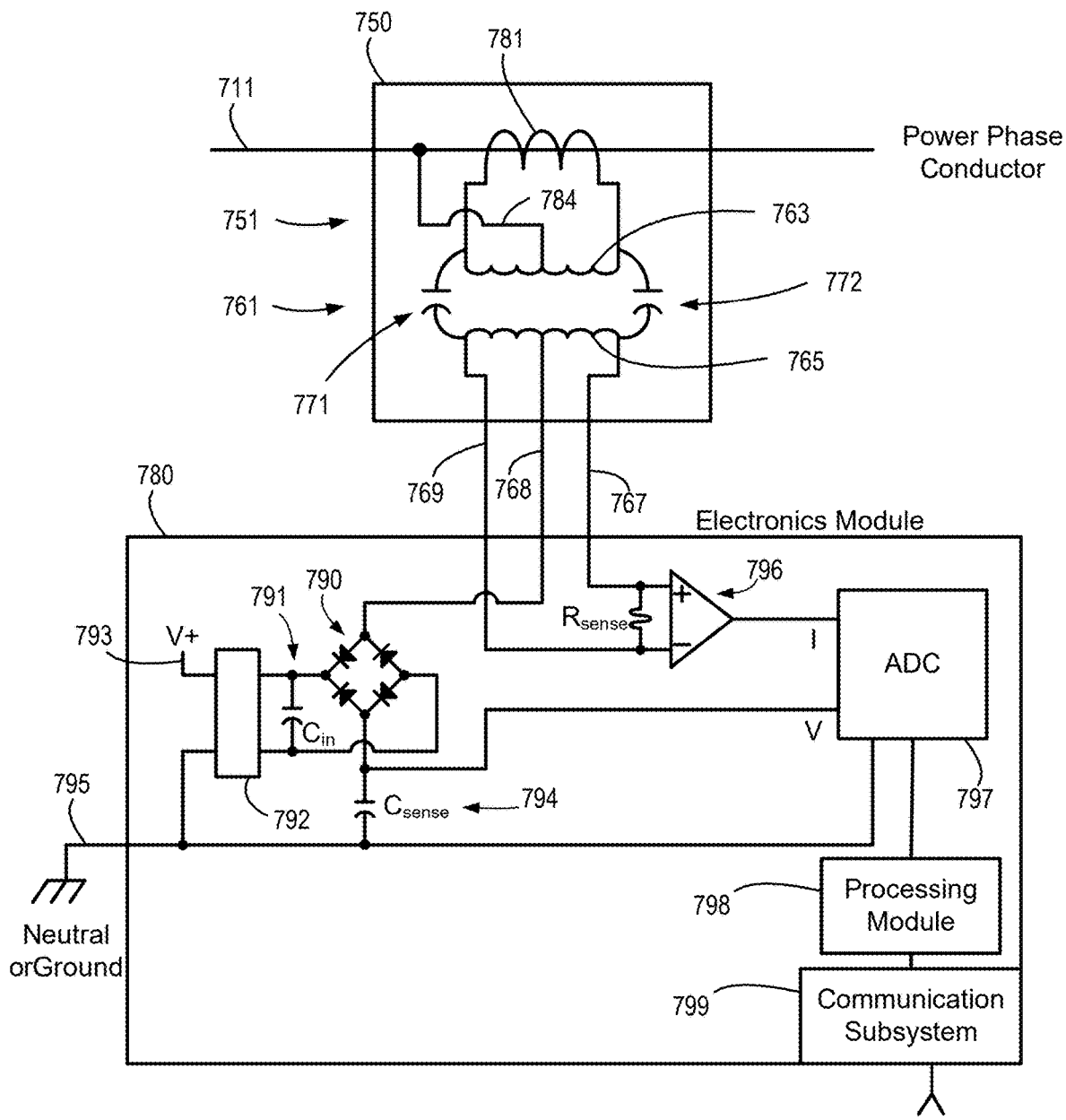
FIG. 7A illustrates an example schematic diagram of a power harvesting circuit of a sensor device connected to a secondary winding of a CT isolation clamp, according to one embodiment.

FIG. 7A illustrates an example schematic diagram of a power harvesting circuit and a sensing circuit connected to a secondary winding 765 of an isolation CT 761 of a CT isolation clamp 750, according to one embodiment. As illustrated, the CT isolation clamp 750 includes a step-down CT 751 with a secondary winding 781 coupled to a phase conductor 711. The isolation CT 761 of the CT isolation clamp 750 includes a center-tapped primary winding 763 connected to the step-down secondary winding 781 of the step-down CT 751. A center tap 784 of the primary winding 763 of the isolation CT 761 is connected to the phase conductor 711. The isolation CT 761 includes a center-tapped isolated secondary winding 765. The illustrated schematic diagram shows parasitic capacitance as capacitors 771 and 772 between the primary winding 763 and the second winding 765 of the isolation CT 761. In some embodiments, actual, physical capacitors may be added to increase the capacitance, but many embodiments rely on the inherent parasitic capacitance in the isolation CT 761.

The first end wire 767 and the second end wire 769 of the secondary winding 765 of the isolation CT 761 are connected to a sensing circuit within an electronics module 780. The sensing circuit may include any of a wide variety of circuit components and measurement devices to measure currents and/or voltages associated with the phase conductor 711. Any of a wide variety of sensing circuit designs and components may be utilized within the electronics module 780. In the simplified example, the sensing circuit includes a differential amplifier 796 whose inputs are connected to the first end wire 767 and the second end wire 769 of the secondary winding 765 of the isolation CT 761 in parallel with a resistor (R-sense). An analog-to-digital converter (ADC) 797 may generate a digital signal representative of the current output by the differential amplifier 796.

The center tap wire 768 of the secondary winding 765 of the isolation CT 761 may also be connected to the ADC 797 to provide voltage information. In the illustrated example, the center tap wire 768 of the secondary winding 765 of the isolation CT 761 is routed through a bridge rectifier 790 and the measurement is taken across a capacitor 794 (C-sense) with the ADC 797 also connected to ground potential 795. A processing module 798 may receive and process the digital signal from the ADC 797 to determine or calculate various power characteristics of the phase conductor 711, such as voltages and/or currents.

The center tap wire 768 of the secondary winding 765 of the isolation CT 761 may also be connected to a power harvesting circuit that harvests power from the phase conductor 711 for use by the other modules, subsystems, and components of the electronics module 780. In the illustrated example, the center tap wire 768 of the secondary winding 765 of the isolation CT 761 is directed through a capacitor 791 and bridge rectifier 790 to an isolated switch mode supply 792 referenced to ground potential 795. The isolated switch mode supply 792 provides a power output 793 that can be used by the other components, modules, and subsystems within the electronics module 780, such as the sensing circuit components and communication subsystem 799.

The communication subsystem 799 may transmit the power characteristic values determined by the sensing circuit to a remote device. In some embodiments, the communication subsystem 799 may be embodied as a radio communication subsystem to communicate via wireless transmissions. The communication subsystem 799 may provide two-way communication or only one-way communication. In some embodiments, the electronics module 780 may not include a processing module 798. In such embodiments, the communication subsystem 799 may transmit the digital signals from the ADC 797 directly to a remote device for remote processing, monitoring, calculations, determinations, etc. In some embodiments, the communication subsystem 799 may transmit the digital signals from the ADC 797 to a local device via communication cables (e.g., ethernet cables, fiber optic cables, serial cables, etc.).

In some embodiments, the communication subsystem 799 may be configured to continuously transmit data, transmit data according to a periodic schedule, transmit data only upon request, transmit buffered data at periodic intervals, etc. In embodiments that include the processing module 798, the communication subsystem 799 may transmit data only when directed to do so by the processing module 798 (e.g., in response to a detected anomaly or change in power characteristics exceeding an established threshold).

Figure 7B:
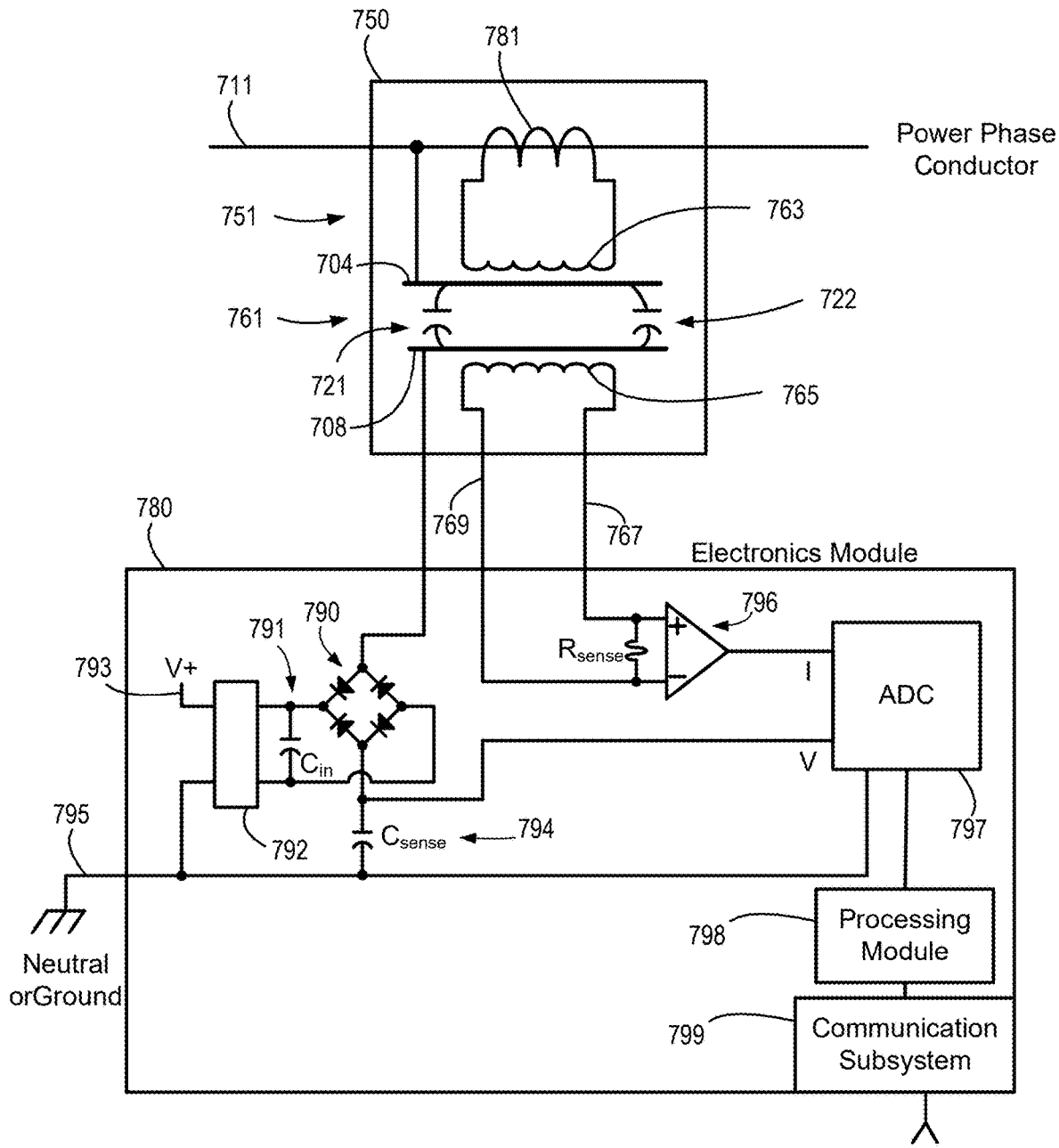
FIG. 7B illustrates an example schematic diagram of a power harvesting circuit of a sensor device connected to a secondary shield of a CT isolation clamp, according to one embodiment.

FIG. 7B illustrates an example schematic diagram of a power harvesting circuit of a sensor device connected to a secondary shield 708 of an isolation CT 761 of a CT isolation clamp 750, according to one embodiment. The isolation CT 761 includes a primary shield 704 positioned between the dielectric material (dielectric spacer) and the primary winding 763. The primary shield 704 is connected to the phase conductor 711 via a wire. The isolation CT 761 also includes a secondary shield 78 positioned between the secondary winding 765 and the dielectric spacer. A parasitic capacitance 721 and 722 is created between the primary shield 704 and the secondary shield 708. The secondary shield 708 is configured to be connected to a power harvesting circuit, as described, for example, in conjunction with FIG. 7A.

Figure 8:
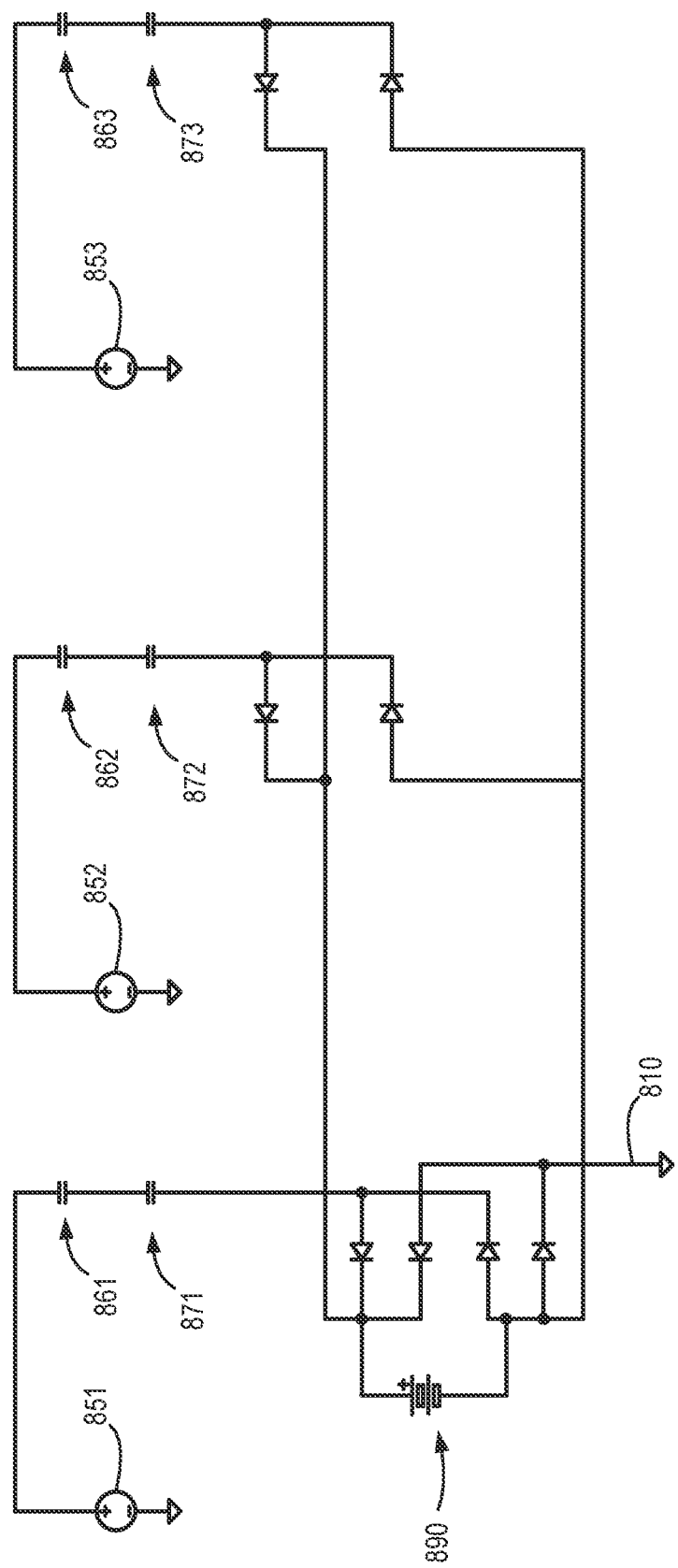
FIG. 8 illustrates an example of a schematic diagram for simulating power harvesting from three passive sensors, according to one embodiment.

FIG. 8 illustrates an example of a schematic diagram for simulating power harvesting from three passive sensors (e.g., CT isolation clamps), according to one embodiment. The three passive sensors and line voltages are illustrated in the simulation schematic as sources 851, 852, and 853. In the illustrated example, a single isolated switch mode supply 890 (modeled as a battery in the simulation schematic) is used to harvest power from all three phases of a three-phase power distribution or transmission system. In other embodiments, a discrete power harvesting circuit may be employed for each phase conductor (e.g., utilizing three different switch mode supplies). The illustrated example uses a single, common switch mode supply.

The parasitic capacitance associated with each of the CT isolation clamps is modeled as capacitors 861, 862, and 863. The sensing capacitors of each phase (e.g., C-Sense 794, FIG. 7A) are modeled as capacitors 871, 872, and 873. The modeled parasitic capacitors 861, 862, and 863 and the sensing capacitors 871, 872, and 873 are modeled in series with the sources 851, 852, and 853, respectively. The power harvesting circuit operates with a single isolated switch mode supply 890 using the illustrated arrangement of diodes and connected ground potential 810. The arrangement of diodes provides a bridge combination for the three phase conductors.

Figure 9:
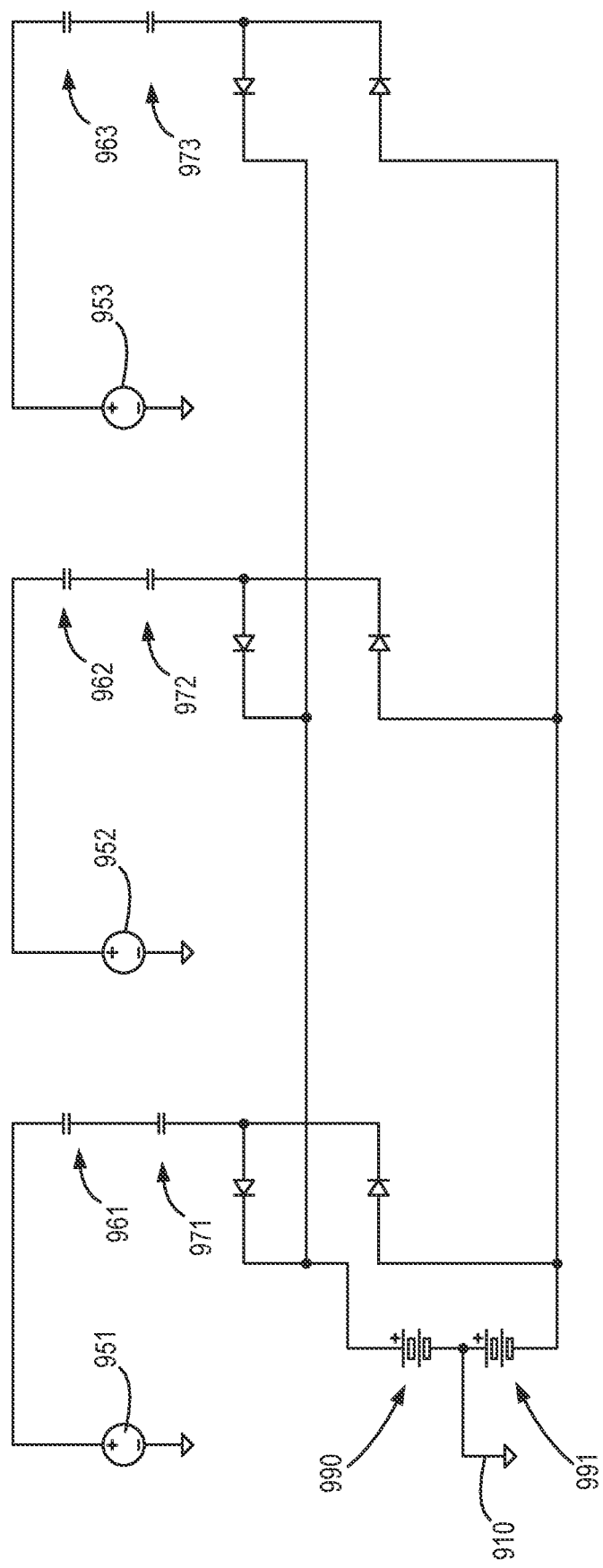
FIG. 9 illustrates an alternative example of a schematic diagram for simulating power harvesting from three passive sensors, according to one embodiment.

FIG. 9 illustrates an alternative example of a schematic diagram for simulating power harvesting from three passive sensors (e.g., CT isolation clamps), according to one embodiment. The three passive sensors and line voltages are illustrated in the simulation schematic as sources 951, 952, and 953. In the illustrated example, two switch mode supplies 990 and 991 do not require isolation since the inputs and outputs are both referenced to ground potential 910. Again, the switch mode supplies 990 and 991 are modeled as batteries in the simulation schematic. Similarly, the parasitic capacitance associated with each of the CT isolation clamps is modeled as capacitors 961, 962, and 963. The sensing capacitors of each phase (e.g., C-Sense 794, FIG. 7A) are modeled as capacitors 971, 972, and 973. The modeled parasitic capacitors 961, 962, and 963 and the sensing capacitors 971, 972, and 973 are modeled in series with the sources 951, 952, and 953, respectively. The power harvesting circuit operates with dual switch mode supplies 990 and 991 using the illustrated arrangement of diodes and connected ground potential 910.

It is appreciated that alternative configurations of power harvesting circuits may be utilized in conjunction with the CT isolation clamps described herein. The CT isolation clamps described herein provide for a high level of electrical isolation that allows the outputs to be combined in a single electronics module that operates at ground potential with any of a wide variety of sensing circuits and/or communications subsystems. The power harvesting circuit, according to any embodiment or variation, allows for a stand-alone self-powered installation of a three-phase power-harvesting sensor system onto any three-phase power distribution or transmission system.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope and understanding of this disclosure should, therefore, be determined to encompass at least the following claims.

The invention claimed is:

1. A current transformer (CT) isolation clamp, comprising:
    a mechanical clamping device adapted to selectively secure the CT isolation clamp to a phase conductor;
    a step-down CT configured to provide a stepped-down current on a secondary winding that corresponds to a current of the phase conductor stepped down by a first step-down ratio; and
    an isolation CT comprising:
        a primary winding connected to the secondary winding of the step-down CT,
        a center tap on the primary winding configured to be connected to the phase conductor,
        an isolated secondary winding to provide a threshold level of electrical isolation from the primary winding, and
        a center tap on the secondary winding configured to be connected to a power harvesting circuit.

2. The CT isolation clamp of claim 1, wherein the mechanical clamping device includes an integrated primary winding of the step-down CT.

3. The CT isolation clamp of claim 1, wherein the isolation CT is a passive isolation CT where the number of windings in the primary winding of the isolation CT is equal to the number of windings in the isolated secondary winding of the isolation CT.

4. The CT isolation clamp of claim 1, wherein the first step-down ratio is 1:10,000, and wherein the primary winding of the isolation CT and the isolated secondary winding of the isolation CT each have 194 turns, such that the isolation CT is a passive isolation CT.

5. The CT isolation clamp of claim 1, wherein the threshold level of electrical isolation between the primary winding and the isolated secondary winding is at least 22,000 Volts.

6. The CT isolation clamp of claim 1, wherein the isolated secondary winding of the CT isolation clamp comprises a toroidal-wound core covered in a dielectric material that provides the threshold level of electrical isolation, and wherein the primary winding of the CT isolation clamp is wound around the dielectric material.

7. A current transformer (CT) isolation clamp, comprising:
a mechanical clamping device adapted to selectively secure the CT isolation clamp to a phase conductor;
a step-down CT configured to provide a stepped-down current on a secondary winding that corresponds to a current of the phase conductor stepped down by a first step-down ratio; and
a passive isolation CT comprising:
a primary winding connected to the secondary winding of the step-down CT,
a secondary winding having the same number of turns as the primary winding of the passive isolation CT,
a dielectric spacer to physically separate and provide a threshold level of electrical isolation between the primary winding of the passive isolation CT and the secondary winding of the passive isolation CT,
a primary shield positioned between the dielectric spacer and the primary winding of the passive isolation CT, the primary shield configured to be connected to the phase conductor via a wire, and
a secondary shield configured to be connected to a power harvesting circuit via a wire, wherein the secondary shield is positioned between the secondary winding of the passive isolation CT and the dielectric spacer to create a parasitic capacitance between the primary shield and the secondary shield.

8. The CT isolation clamp of claim 7, wherein the mechanical clamping device includes an integrated primary winding of the step-down CT.

9. The CT isolation clamp of claim 7, wherein the first step-down ratio is 1:10,000.

10. The CT isolation clamp of claim 7, wherein the threshold level of electrical isolation between the primary winding and the isolated secondary winding is at least 22,000 Volts.

11. The CT isolation clamp of claim 7, wherein the passive isolation CT comprises a toroidal passive isolation CT.

12. A three-phase power-harvesting sensor system, comprising:
a first current transformer (CT) isolation clamp configured to be mounted to a first phase conductor of a three-phase power system,
a second CT isolation clamp configured to be mounted to a second phase conductor of the three-phase power system, and
a third CT isolation clamp configured to be mounted to a third phase conductor of the three-phase power system; and
an electronics module connected to each of the first, second, and third CT isolation clamps, the electronics module comprising:
a sensing circuit to determine a power characteristic of the three-phase power system based on an output of at least one of the first, second, and third CT isolation clamps;
a communication subsystem to transmit the determined power characteristic to a remote device; and
a power harvesting circuit to harvest power from at least one phase of the three-phase power system via at least one of the first, second, and third CT isolation clamps to operate the sensing circuit and the communication subsystem,
wherein each CT isolation clamp comprises:
a mechanical clamping device adapted to selectively mount the CT isolation clamp to a selected phase conductor;
a step-down CT configured to provide a stepped-down current on a secondary winding that corresponds to a current of the selected phase conductor, stepped down by a first step-down ratio; and
an isolation CT, comprising:
a center-tapped primary winding with a center tap configured to be connected to the selected phase conductor, the center-tapped primary winding connected to the step-down secondary winding of the step-down CT, and
an isolated secondary winding that is isolated with a threshold level of electrical isolation from the primary winding of the isolation CT, wherein the isolated secondary winding comprises a center-tapped isolated secondary winding with a center tap configured to be connected to the power harvesting circuit.

13. The system of claim 12, wherein the first step-down ratio is 1:10,000.

14. The system of claim 12, wherein the power harvesting circuit comprises a single isolated switch mode supply with rectified inputs from the center taps on the secondary windings of each of the isolation CTs of the first, second, and third CT isolation clamps.

15. The system of claim 12, wherein each isolation CT is a passive isolation CT where the number of windings in the primary winding of the isolation CT is equal to the number of windings in the isolated secondary winding of the isolation CT.

16. The system of claim 12, wherein each isolation CT is a step-down isolation CT where the number of windings in the primary winding of the isolation CT is greater than the number of windings in the isolated secondary winding of the isolation CT.

17. The system of claim 12, wherein the sensing circuit comprises:
first, second, and third differential amplifiers connected to the first, second, and third CT isolation clamps, respectively, and
an analog-to-digital converter (ADC) to receive signals from the outputs of each of the first, second, and third differential amplifiers.

18. A three-phase power-harvesting sensor system, comprising:

a first current transformer (CT) isolation clamp configured to be mounted to a first phase conductor of a three-phase power system,
a second CT isolation clamp configured to be mounted to a second phase conductor of the three-phase power system, and
a third CT isolation clamp configured to be mounted to a third phase conductor of the three-phase power system; and
an electronics module connected to each of the first, second, and third CT isolation clamps, the electronics module comprising:
  a sensing circuit to determine a power characteristic of the three-phase power system based on an output of at least one of the first, second, and third CT isolation clamps;
  a communication subsystem to transmit the determined power characteristic to a remote device; and
  a power harvesting circuit to harvest power from at least one phase of the three-phase power system via at least one of the first, second, and third CT isolation clamps to operate the sensing circuit and the communication subsystem,
wherein each CT isolation clamp comprises:
  a mechanical clamping device adapted to selectively mount the CT isolation clamp to a selected phase conductor;
  a step-down CT configured to provide a stepped-down current on a secondary winding that corresponds to a current of the selected phase conductor, stepped down by a first step-down ratio; and
  an isolation CT, comprising:
    a primary winding connected to the step-down secondary winding of the step-down CT,
    an isolated secondary winding that is isolated with a threshold level of electrical isolation from the primary winding of the isolation CT, wherein the isolated secondary winding of each isolation CT is isolated with the threshold level of electrical isolation via a dielectric spacer positioned around the isolated secondary winding that separates the isolated secondary winding and the primary winding,
    a primary shield positioned between the dielectric spacer and the primary winding and configured to be connected to the phase conductor via a wire, and
    a secondary shield configured to be connected to the power harvesting circuit, the secondary shield positioned between the isolated secondary winding and the dielectric spacer to create a parasitic capacitance between the primary shield and the secondary shield.

19. The system of claim 18, wherein the power harvesting circuit comprises two switch mode supplies referenced to ground and rectified inputs from the secondary shields of each of the isolation CTs of the first, second, and third CT isolation clamps.

20. The system of claim 18, wherein the sensing circuit comprises:
first, second, and third differential amplifiers connected to the first, second, and third CT isolation clamps, respectively, and
an analog-to-digital converter (ADC) to receive signals from the outputs of each of the first, second, and third differential amplifiers.

21. The system of claim 18, wherein the first step-down ratio is 1:10,000.

22. The system of claim 18, wherein the power harvesting circuit comprises a single isolated switch mode supply with rectified inputs from the center taps on the secondary windings of each of the isolation CTs of the first, second, and third CT isolation clamps.

23. The system of claim 18, wherein each isolation CT is a passive isolation CT where the number of windings in the primary winding of the isolation CT is equal to the number of windings in the isolated secondary winding of the isolation CT.

24. The system of claim 18, wherein each isolation CT is a step-down isolation CT where the number of windings in the primary winding of the isolation CT is greater than the number of windings in the isolated secondary winding of the isolation CT.

* * * * *